– 
United States Patent
Eftekhari et al.

(10) Patent No.: US 11,777,170 B2
(45) Date of Patent: Oct. 3, 2023

(54) BATTERY PACK ENCLOSURE WITH TURNED FLANGE

(71) Applicant: Ford Global Technologies, LLC, Dearborn, MI (US)

(72) Inventors: Mohammadreza Eftekhari, Novi, MI (US); Himanshu Khandelwal, Warren, MI (US); Melissa Kathryn Christensen, New Hudson, MI (US); Dave Moschet, Novi, MI (US); Saravanan Paramasivam, South Lyon, MI (US); Thomas Edward Smith, Livonia, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/330,989

(22) Filed: May 26, 2021

(65) Prior Publication Data

US 2022/0384896 A1   Dec. 1, 2022

(51) Int. Cl.
| | |
|---|---|
| *H01M 50/264* | (2021.01) |
| *H01M 50/278* | (2021.01) |
| *B60K 6/28* | (2007.10) |
| *B60L 50/64* | (2019.01) |
| *H01M 50/209* | (2021.01) |
| *H01M 50/249* | (2021.01) |

(52) U.S. Cl.
CPC ............ *H01M 50/264* (2021.01); *B60K 6/28* (2013.01); *B60L 50/64* (2019.02); *H01M 50/209* (2021.01); *H01M 50/249* (2021.01); *H01M 50/278* (2021.01); *B60Y 2200/91* (2013.01); *B60Y 2200/92* (2013.01); *B60Y 2400/112* (2013.01); *H01M 2220/20* (2013.01)

(58) Field of Classification Search
CPC .................................................. H01M 50/264
See application file for complete search history.

(56) References Cited

U.S. PATENT DOCUMENTS

| | | | |
|---|---|---|---|
| 2016/0293914 A1 | 10/2016 | Miller et al. | |
| 2018/0241019 A1* | 8/2018 | Iqbal | H01M 50/227 |
| 2019/0341592 A1 | 11/2019 | Linde et al. | |
| 2020/0052252 A1 | 2/2020 | Smith et al. | |

\* cited by examiner

*Primary Examiner* — Kwang Han
*Assistant Examiner* — Jordan E Berresford
(74) *Attorney, Agent, or Firm* — David B. Kelley; Carlson, Gaskey & Olds, P.C.

(57) ABSTRACT

A traction battery pack assembly includes, among other things, first and second pieces of an enclosure having an interior area. An attachment rim is disposed at a periphery of the first piece. The attachment rim has a stand-off that includes a platform portion and turned flange. The platform portion extends outward from the interior area in a first direction. The platform portion provides an aperture. The turned flange extends away from the platform portion in a second direction and terminates at an end face. The second direction is transverse to the first direction. The aperture is configured to receive a fastener that clamps the end face against the second piece.

17 Claims, 4 Drawing Sheets

BATTERY PACK ENCLOSURE WITH TURNED FLANGE

TECHNICAL FIELD

This disclosure relates generally to a battery pack enclosure and, more particularly, to an attachment rim of the battery pack enclosure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. The traction battery can include an enclosure that houses battery arrays.

SUMMARY

A traction battery pack assembly according to an exemplary aspect of the present disclosure includes, among other things, first and second pieces of an enclosure having an interior area. An attachment rim is disposed at a periphery of the first piece. The attachment rim has a stand-off that includes a platform portion and turned flange. The platform portion extends outward from the interior area in a first direction. The platform portion provides an aperture. The turned flange extends away from the platform portion in a second direction and terminates at an end face. The second direction is transverse to the first direction. The aperture is configured to receive a fastener that clamps the end face against the second piece.

Another exemplary embodiment of the foregoing assembly includes the fastener extending through the aperture to threadably engage a bore in the second piece.

Another exemplary embodiment of any of the foregoing assemblies includes at least one array of battery cells disposed within the interior area.

In another exemplary embodiment of any of the foregoing assemblies, the platform portion is disposed within a horizontal plane.

In another exemplary embodiment of any of the foregoing assemblies, the turned flange extends vertically in the second direction from the platform to the end face.

In another exemplary embodiment of any of the foregoing assemblies, the turned flange extends vertically downward from the platform to the end face.

In another exemplary embodiment of any of the foregoing assemblies, the end face directly contacts the second piece.

In another exemplary embodiment of any of the foregoing assemblies, the first piece is a lid of a battery enclosure, and the second piece is a tray of the battery enclosure.

In another exemplary embodiment of any of the foregoing assemblies, the aperture in the platform has a circumferentially continuous perimeter defined entirely by the platform portion.

In another exemplary embodiment of any of the foregoing assemblies, the aperture is a slot that opens to an outermost side of the stand-off.

In another exemplary embodiment of any of the foregoing assemblies, the attachment rim includes a plurality of interfacing regions that are configured to directly contact the second piece when the fastener clamps the end face against the second piece.

In another exemplary embodiment of any of the foregoing assemblies, the at least one stand-off is a plurality of stand-offs.

In another exemplary embodiment of any of the foregoing assemblies, the attachment rim includes interfacing regions alternating with the stand-offs about an entire circumferentially continuous perimeter of the interior area.

In another exemplary embodiment of any of the foregoing assemblies, the first piece is a fiber reinforced material.

In another exemplary embodiment of any of the foregoing assemblies, the first piece is a sheet molding compound.

An enclosure securing method according to another exemplary aspect of the present disclosure includes, among other things, providing first and second pieces of an enclosure and pressing an attachment rim of the first piece against the second piece to enclose an interior area that houses a plurality of battery cells. The attachment rim includes a stand-off having a platform and a turned flange. An end face of the turned flange is held against the second piece during the pressing.

Another example of the foregoing method includes pressing by securing a fastener that extends through an aperture in the platform.

In another example of the foregoing method, the platform is spaced from the second piece during the pressing.

In another exemplary embodiment of the foregoing method, the attachment rim includes interfacing regions alternating with the stand-offs about an entire circumferentially continuous perimeter of the interior area. The attachment rim directly contacts the second piece during the pressing.

An enclosure trimming method according to yet another exemplary aspect of the present disclosure includes the steps of trimming an attachment flange of a battery pack enclosure, the attachment flange including a fastener aperture.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a battery pack enclosure. In particular, the disclosure relates to a battery pack enclosure having an attachment rim with a stand-off. The attachment rim is used to connect pieces of the enclosure. The stand-off can reduce an overall size of the battery pack while maintaining desired strength and attachment characteristics.

Figure 1:
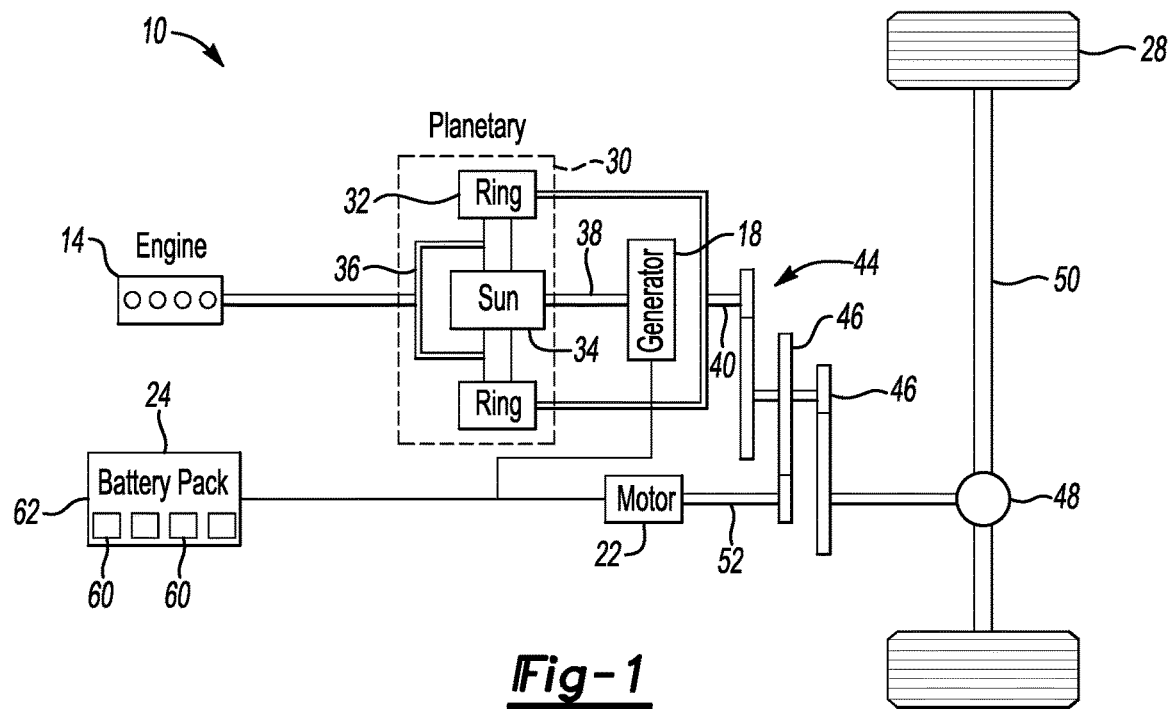
FIG. 1 illustrates a schematic view of an example powertrain for an electrified vehicle.
Figure 2:
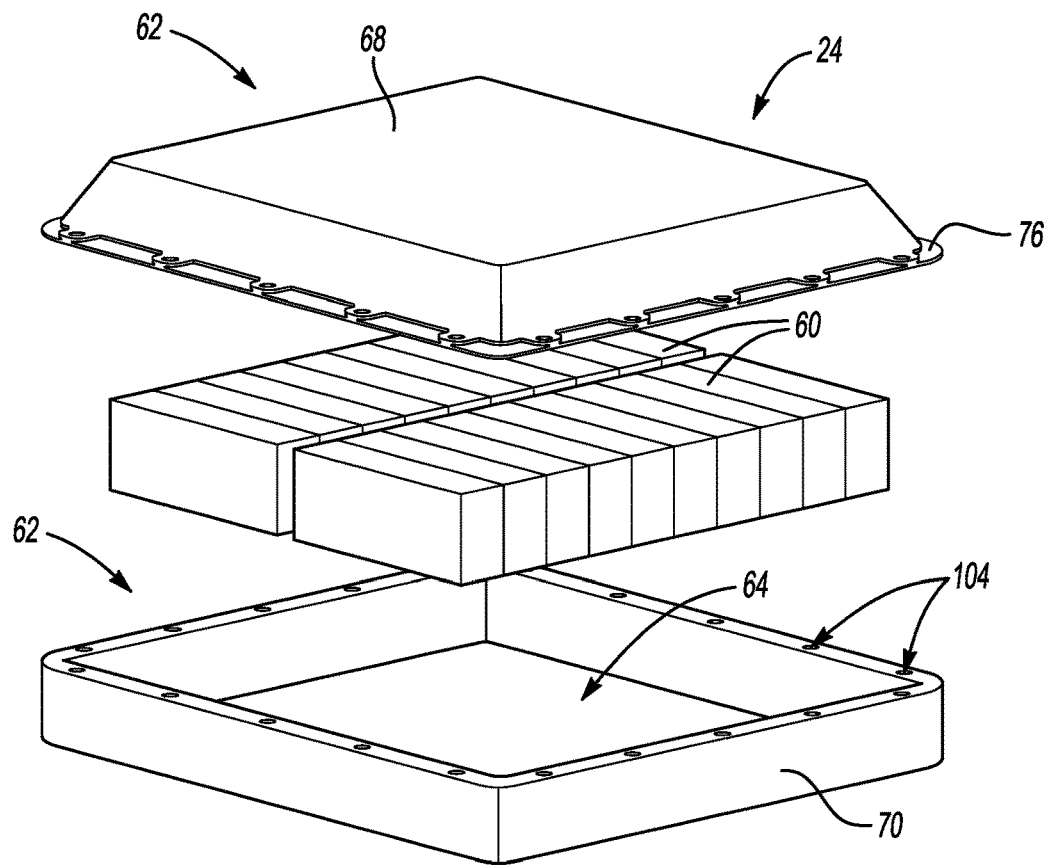
FIG. 2 illustrates an expanded view of a traction battery from the powertrain of FIG. 1.
Figure 3:
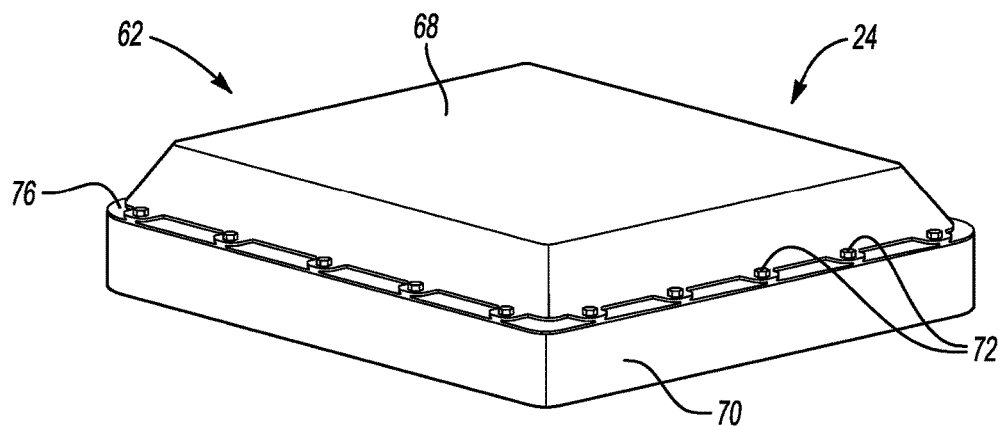
FIG. 3 illustrates the traction battery of FIG. 2 when assembled.
Figure 4:
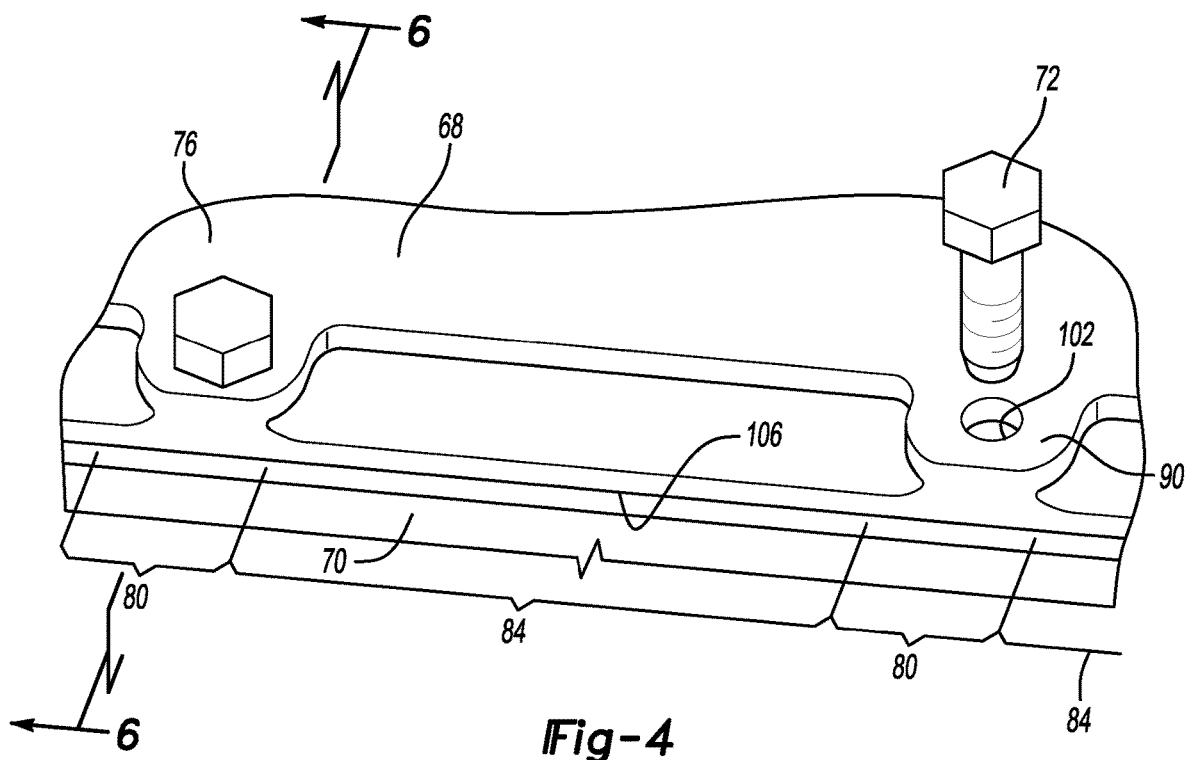
FIG. 4 illustrates a close-up view of a portion of an attachment rim of an enclosure of FIG. 3.
Figure 5:
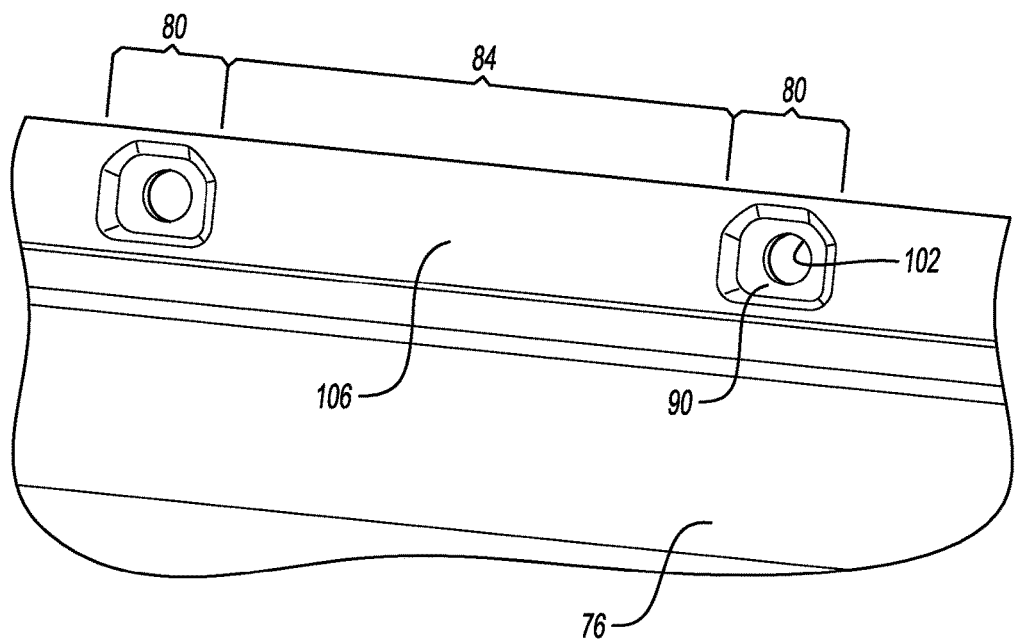
FIG. 5 illustrates an underside of the portion of the attachment rim shown in FIG. 4.
Figure 6:
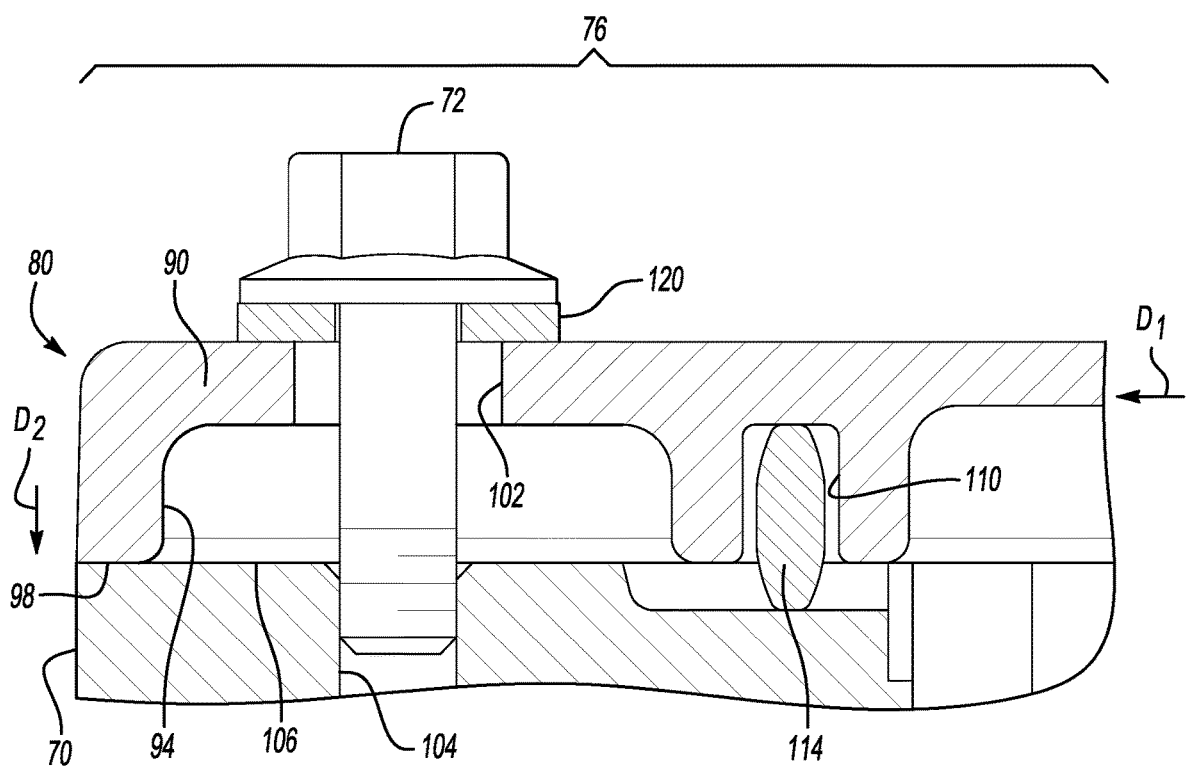
FIG. 6 illustrates a section view taken at line 6-6 in FIG. 4.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle enclosure assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to propel the wheels 28. The battery pack 24 can include a plurality of arrays 60 of individual battery cells held within an enclosure 62.

With reference now to FIGS. 2-6, the enclosure 62 of the battery pack 24 provides an interior area 64 that holds the arrays 60 of individual battery cells. The interior area 64 can also hold other components of the battery pack 24, such as electronic components, control modules, etc.

The exemplary enclosure 62 includes a plurality of pieces. In this embodiment, a first piece of the enclosure 62 is a lid 68, and a second piece of the enclosure is a tray 70. Fasteners 72, here threaded fasteners 72, secure the lid 68 to the tray 70 to enclose the arrays 60 within the interior area 64.

The exemplary enclosure 62 includes two pieces (i.e., the lid 68 and the tray 70) secured together to enclose the interior area 64. Other enclosures could include other numbers of pieces.

The lid 68 includes an attachment rim 76 that is disposed at a periphery of the lid 68. In this example, the rim 76 extends circumferentially continuously about an entire perimeter of the lid 68 and the interior area 64.

The attachment rim 76 projects horizontally outward from the interior area 64 in this example. Horizontal and vertical, for purposes of this disclosure, are with reference to the general orientation of the battery pack 24 when installed within a vehicle.

At least some of the enclosure 62 is a reinforced material that is polymer-based. In particular, in the exemplary embodiment, the lid 68 is sheet molding compound (SMC), which is a fiber reinforced polyester material. In this example, the SMC is a glass fiber reinforced polyester.

The lid 68 is formed from a sheet of SMC during a compression molding process. After forming the lid 68, the reinforcing fiber can be inconsistently distributed throughout the lid 68. In particular, the peripheral areas of the lid 68 and areas of the attachment rim 76 can include less reinforcement fiber than other areas.

In the past, to compensate for inconsistently distributed reinforcement fibers, the attachment rims of enclosure pieces were extended outward well past fasteners. This helped to ensure that the areas of the lid near the fasteners included adequate reinforcement fibers. However, this approach results in an enclosure having a larger packaging footprint than the enclosure 62.

The exemplary embodiment ensures that there are adequate reinforcement fibers in the areas of the fasteners 72 using a plurality of stand-offs 80 instead of relying primarily on how far the attachment rim extends outwardly past the fasteners 72.

The attachment rim 76 includes stand-offs 80 and interfacing regions 84 that alternate with each other about a circumferentially continuous perimeter of the interior area 64. The interfacing regions 84 are, in this example, configured to directly contact the tray 70 when the enclosure 62 is assembled.

The stand-off 80 includes a platform portion 90 and a turned flange 94. The platform portion 90 extends outward from the interior area 64 in the first direction $D_1$, which is horizontal in this example. The turned flange 94 extends away from the platform portion 90 in a second direction $D_2$, which is vertically downward in this example. The turned flange 94 extends, in the exemplary embodiment, vertically downward from the platform portion 90 and terminates at an end face 98. In some examples, the turned flange 94 could be a thicker section projecting vertically downward from the platform portion 90. That is, the platform portion 90 and the turned flange 94 could have dissimilar thicknesses. Also, physically turning material to provide the turned flange 94 is not required in some examples.

The platform portion 90 includes an aperture 102 that receives a respective one of the fasteners 72. The fasteners 72 can extend through the aperture 102 to clamp the end face 98 against the tray 70.

In this example, the fastener 72 extends through the aperture 102 to threadably engage a bore 104 in the tray 70 when clamping the end face 98 against the tray 70. When the fastener 72 is secured, the end face 98 directly contacts the tray 70 in this example. In another example, the end face 98 is clamped against the tray 70 with an intervening seal or other structure physically between the end face 98 and the tray 70.

Figure 7:
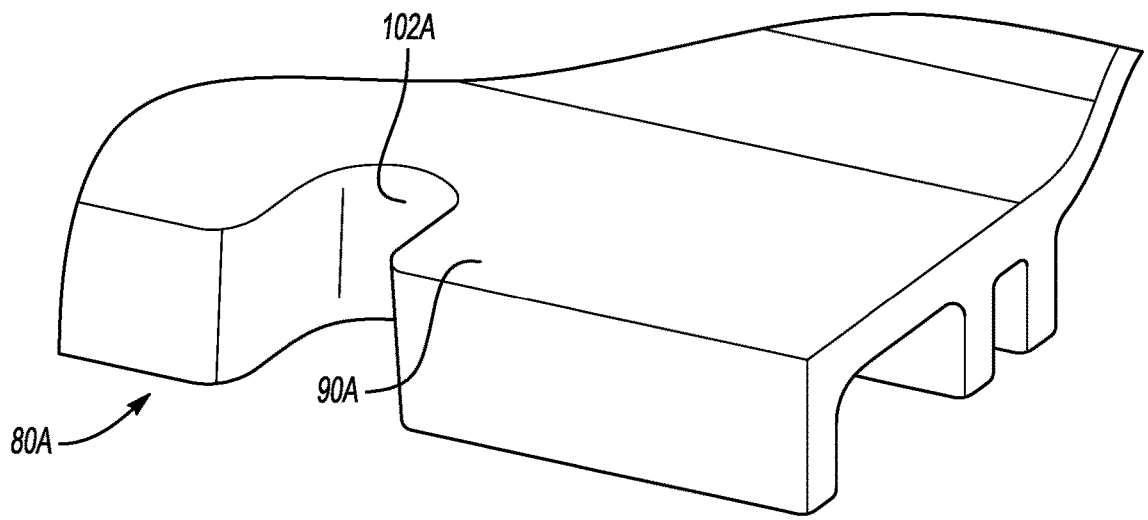
FIG. 7 illustrates a portion of an enclosure piece according to another exemplary aspect of the present disclosure.

The aperture 102 has its entire circumferential perimeter defined by the platform portion 90 in this example. In another example, as shown in FIG. 7, a platform 90A can define an aperture 102A that is open to an outermost side of a stand-off 80A.

Referring again to FIGS. 2-6, the end face 98 is vertically aligned with a lowermost surface 106 of the interfacing regions 84 when the fastener 72 is secured. The lowermost surface 106, directly contacts the tray 70 when the lid 68 is secured to the tray 70

In addition to the platform portion 90 and the turned flange 94, the attachment rim 76 includes a seal channel 110 that holds a seal 114. The seal 114 and the channel 108 extend circumferentially continuously about an entire perimeter of the interior area 64. The seal 114 can contact the tray 70 to seal the interface between the lid 68 and the tray 70 when the fastener 72 is secured and clamping the end face 98 and the lowermost surface 106 of the attachment rim 76 against the tray 70.

The turned flange 94 ensures that there is adequate reinforcement material positioned outboard the aperture 102. The turned flange 94 can also help to strengthen the lid 68 when the aperture 102 is machined into the lid 68 after compression molding the lid 68. The apertures 102 can be machined using a punching or drilling process for example.

The stand-offs 80 provide the platform portion 90 at an elevated position. The head of the fastener 72 and a washer 120 are thus at a vertically higher position than the seal 114 and seal channel 110. Thus, if required, a diameter of the washer 120 can have an increased diameter that laterally overlaps with the seal 114, the seal channel 110, or both if a larger washer is desired.

Figure 8A:
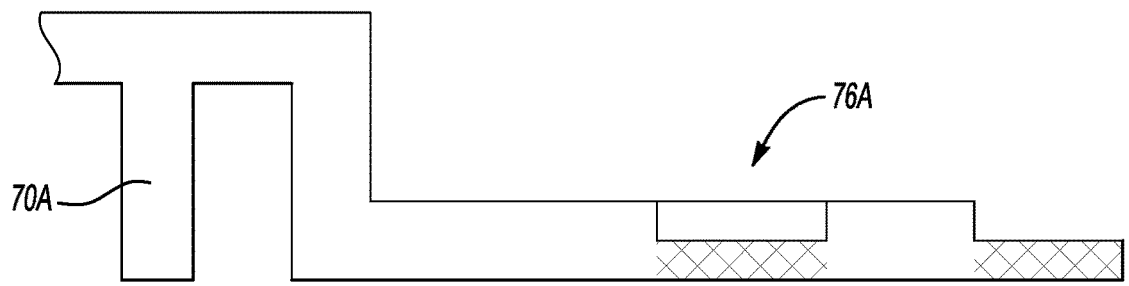
FIGS. 8A and 8B illustrate an enclosure piece before and after a trimming operation according to another exemplary embodiment of the present disclosure.
Figure 8B:
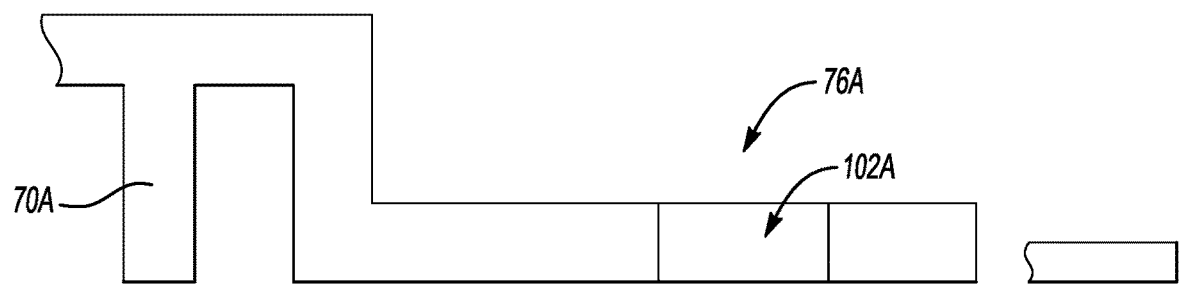

With reference now to FIGS. 8A and 8B, another exemplary embodiment can omit the stand-offs. Instead, an attachment rim 76A of an enclosure piece 70A can be trimmed while machining an aperture 102A in the attachment rim 76A. At least partially overlapping the trimming and machining of the aperture can ensure that the attachment rim 76A can adequately withstand the machining of the aperture 102A. Because the attachment rim 76A is not yet fully trimmed when the forming starts, there is adequate reinforcement material to support the attachment rim 76A when the machining of the aperture 102A starts. FIG. 8A shows the attachment rim 76A prior to the trimming and machining. FIG. 8B shows the attachment rim 76A after the trimming and machining. The machining of the aperture 76A can be a punching operation, for example.

While described as trimming while machining, the trimming could occur after the machining in another example. The aperture 102A could also be formed into the attachment rim 76A without machining. The attachment rim 76A is then trimmed with the aperture 102A formed in the attachment rim 76A.

Features of the disclosed example include a traction battery enclosure assembly having a stand-off with a turned flange. The turned flange can reduce how far the enclosure needs to extend outward past an enclosure fastener by at least fifteen millimeters. The turned flange may make the need for compression limiters between pieces of the enclosure.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery pack assembly, comprising:
    first and second pieces of an enclosure having an interior area;
    an attachment rim of the first piece, the attachment rim disposed at a periphery of the first piece; and
    at least one stand-off of the attachment rim, the at least one stand-off includes a platform portion and a turned flange,
        the platform portion extends in a first direction outward from the interior area to the turned flange, the platform portion provides an aperture,
        the turned flange extends in a second direction from the platform portion to an end face, the second direction is transverse to the first direction,
        the aperture is configured to receive a fastener that clamps the end face against the second piece,
        wherein the turned flange extends away from the platform portion in the second direction such that the end face of the turned flange is spaced a distance in the second direction from all portions of the platform portion.

2. The assembly of claim 1, wherein the platform portion is disposed within a horizontal plane, wherein the platform portion is configured to be directly contacted by the fastener when the fastener clamps the end face against the second piece.

3. The assembly of claim 1, wherein the turned flange extends vertically in the second direction from the platform portion to the end face.

4. The assembly of claim 3, wherein the turned flange extends vertically downward from a vertically lowermost surface of the platform portion to the end face.

5. The assembly of claim 1, wherein the end face directly contacts the second piece.

6. The assembly of claim 1, wherein the first piece is a lid of a battery enclosure, and the second piece is a tray of the battery enclosure.

7. The assembly of claim 1, wherein the aperture in the platform has a circumferentially continuous perimeter defined entirely by the platform, wherein the platform portion is configured to be directly contacted by the fastener when the fastener clamps the end face against the second piece.

8. The assembly of claim 1, wherein the aperture is a slot that opens to an outermost side of the stand-off.

9. The assembly of claim 1, wherein the attachment rim includes a plurality of interfacing regions that are configured to directly contact the second piece when the fastener clamps the end face against the second piece, the interfacing regions spaced a distance from the platform portion in the second direction.

10. The assembly of claim 9, wherein the at least one stand-off is a plurality of stand-offs.

11. The assembly of claim 10, wherein the attachment rim includes the interfacing regions alternating with the stand-offs about an entire circumferentially continuous perimeter of the interior area.

12. The assembly of claim 1, wherein the first piece is a fiber reinforced material that provides both the turned flange and the platform portion.

13. The assembly of claim 1, wherein the first piece is a sheet molding compound, the turned flange and the platform portion both portions of the sheet molding compound.

14. A traction battery pack assembly, comprising:
first and second pieces of an enclosure having an interior area;
an attachment rim of the first piece, the attachment rim disposed at a periphery of the first piece; and
at least one stand-off of the attachment rim, the at least one stand-off includes a platform portion and a turned flange,
the platform portion extends in a first direction outward from the interior area to the turned flange, the platform portion provides an aperture,
the turned flange extends in a second direction from the platform portion to an end face, the second direction is transverse to the first direction,
the aperture is configured to receive a fastener that clamps the end face against the second piece
wherein the attachment rim and the at least one stand-off of the attachment rim are a continuous and integral structure that includes both the turned flange and the platform portion.

15. An enclosure securing method, comprising:
providing first and second pieces of an enclosure; and
pressing an attachment rim of the first piece against the second piece to enclosure an interior area that houses a plurality of battery cells, the attachment rim including a plurality of stand-offs each having a platform and a turned flange, an end face of the turned flange held against the second piece during the pressing, wherein the platform is spaced from the second piece during the pressing to provide an open area between the platform and the second piece, the turned flange spanning the opening area.

16. The method of claim 15, further comprising pressing by securing a fastener that extends through an aperture in the platform.

17. The method of claim 15, wherein the attachment rim includes interfacing regions each alternating with one of the stand-offs about an entire circumferentially continuous perimeter of the interior area, the interfacing regions directly contacting the second piece during the pressing, the interfacing regions spaced from the platforms of the stand-offs in a direction of the pressing.

* * * * *